(12) United States Patent
Park et al.

(10) Patent No.: US 12,502,409 B2
(45) Date of Patent: Dec. 23, 2025

(54) COMPOSITION FOR PREVENTING OR TREATING INFLAMMATORY MACROPHAGE-MEDIATED AUTOIMMUNE DISEASE COMPRISING EXOSOMES DERIVED FROM STEM CELLS THAT ARE SURFACE-MODIFIED TO TARGET ACTIVATED MACROPHAGES

(71) Applicant: RESEARCH & BUSINESS FOUNDATION SUNGKYUNKWAN UNIVERSITY, Suwon-si (KR)

(72) Inventors: Jae Hyung Park, Suwon-si (KR); Dong Gil You, Suwon-si (KR); Gyeong Taek Lim, Seoul (KR); Jae Min Jung, Yongin-si (KR); Byeong Hoon Oh, Gwangyang-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 857 days.

(21) Appl. No.: 17/474,118

(22) Filed: Sep. 14, 2021

(65) Prior Publication Data

US 2022/0079998 A1    Mar. 17, 2022

(30) Foreign Application Priority Data

Sep. 15, 2020   (KR) ......................... 10-2020-0118144

(51) Int. Cl.
*A61K 35/545*      (2015.01)
*A61K 9/127*       (2006.01)
(Continued)

(52) U.S. Cl.
CPC ............ *A61K 35/545* (2013.01); *A61K 9/127* (2013.01); *A61K 35/15* (2013.01); *A61K 35/28* (2013.01);
(Continued)

(58) Field of Classification Search
None
See application file for complete search history.

(56) References Cited

PUBLICATIONS

Liu et al., Front. Immunol. 11: 1912 (2020; published Aug. 20, 2020).*

(Continued)

*Primary Examiner* — Erin M. Bowers
(74) *Attorney, Agent, or Firm* — NSIP Law

(57) ABSTRACT

The present invention relates to a composition for preventing, improving and treating an inflammatory macrophage-mediated autoimmune disease, including a stem cell-derived exosome surface-modified with a sugar compound to target an activated macrophage, and the composition according to the present invention may specifically target an activated macrophage to increase the therapeutic efficiency for various types of autoimmune diseases including rheumatoid arthritis. In addition, the composition according to the present invention has a more excellent therapeutic effect and minimizes side effects compared with conventional antiinflammatory agents, stem cell therapeutic agents or exosomes because it contains a gene, protein or growth factor related to the proliferation, differentiation and regeneration of stem cells, and does not include an antibiotic or serum, or harmful factors of the cell culture.

17 Claims, 7 Drawing Sheets

(51) Int. Cl.
    *A61K 35/15*     (2015.01)
    *A61K 35/28*     (2015.01)
    *A61K 35/32*     (2015.01)
    *A61K 35/50*     (2015.01)
    *A61K 35/51*     (2015.01)
    *A61K 47/54*     (2017.01)
    *A61K 47/69*     (2017.01)
    *A61P 19/02*     (2006.01)
    *C12N 5/0783*     (2010.01)

(52) U.S. Cl.
    CPC .............. *A61K 35/32* (2013.01); *A61K 35/50* (2013.01); *A61K 35/51* (2013.01); *A61K 47/549* (2017.08); *A61K 47/6911* (2017.08); *A61P 19/02* (2018.01); *C12N 5/0646* (2013.01)

(56) References Cited

PUBLICATIONS

Jeong et al., Mol. Pharmaceutics 18: 539-549 (2021; published Jun. 5, 2020).*
Lee et al., Biochim. Biophys. Acta. 1862(5): 1091-1100 (2018).*
Fu et al., Carbohydrate Polymers 169: 332-340 (2017).*
Fisher et al., J. Am. Chem. Soc. 139: 7416-7427 (2017).*
Lim, Taek Gyeong, "Development of Exosomes Delivery Platform by Using Metabolic Glycoengineering, and its applications," Sungkyunkwan University Department of Chemical Engineering, 2019, (1 Page in Korean, 45 Pages in English).
Liu, Huan et al., "Immunomodulatory Effects of Mesenchymal Stem Cells and Mesenchymal Stem Cell-Derived Extracellular Vesicles in Rheumatoid Arthritis," Frontiers in Immunology, vol. 11, 2020, (7 Pages in English).

* cited by examiner

COMPOSITION FOR PREVENTING OR TREATING INFLAMMATORY MACROPHAGE-MEDIATED AUTOIMMUNE DISEASE COMPRISING EXOSOMES DERIVED FROM STEM CELLS THAT ARE SURFACE-MODIFIED TO TARGET ACTIVATED MACROPHAGES

CROSS-REFERENCE TO RELATED APPLICATION

This application claims priority to and the benefit of Korean Patent Application No. 10-2020-0118144, filed on Sep. 15, 2020, and the disclosure of the specification and the drawings of the application is incorporated herein by reference in its entirety.

This application was carried out with the support of the Korea Regenerative Medicine Fund (Proposal No. 2021M3E5E5096677) and the Basic Science Research Project (Proposal No. 2018R1A2B3006080), supported by the Ministry of Science and ICT, and the Korean Health Technology R&D project (Proposal No. HI20C0437) supported by the Ministry of Health and Welfare.

BACKGROUND

1. Field of the Invention

The present invention relates to a composition for preventing, improving and treating an inflammatory macrophage-mediated autoimmune disease, which includes a stem cell-derived exosome which is surface-modified to target an activated macrophage as an active ingredient.

2. Discussion of Related Art

The human immune system serves to protect the body from a foreign antigen invading the body, but does not attack its own tissue due to self-tolerance. However, the case in which, as the self-tolerance of the immune system is destroyed, a protein normally expressed by its gene is recognized as an attack target by immune cells, thereby producing an antibody or triggering a T cell response to destroy normal tissue is called autoimmunity, and when a specific symptom occurs, it is called an autoimmune disease.

Rheumatoid arthritis, which is one of the autoimmune diseases, is known to have inflammation in joints by lymphocytes attacking their own molecules due to a wrong reaction of the immune system of the body, and when the disease persists for a long time, muscle atrophy or osteoporosis may worsen, thereby increasing the risk of fracture. Since rheumatoid arthritis may invade major organs such as the lungs, blood vessels and eyes, in addition to joints, and is a chronic disease, there is a high possibility of complications of the digestive system caused by long-term drug use. Currently, as the main therapeutic drugs, antiinflammatory agents that relieve joint inflammation are used, and as anti-rheumatoid drugs, an immunosuppressant such as methotrexate (MTX) or a tumor necrosis factor alpha (TNF-α) inhibitor is used, but they require long-term administration and use two or three drugs such as analgesics in combination, rather than a single drug.

Meanwhile, as a method of treating an autoimmune disease such as rheumatoid arthritis, recently, a therapeutic method using stem cells has received much attention. Injected stem cells are known to exhibit a therapeutic effect by restoring damaged tissues along with immunosuppressive functions. However, the biggest problem of the conventional treatment using stem cells is that, generally, since a cell engraftment rate and a survival rate are not constant depending on a patient, a constant therapeutic effect is not guaranteed. In addition, it is difficult to rule out the risk of stem cells becoming cancerous, and since the culture medium contains not only various growth factors secreted from stem cells but also includes various cell wastes, it may cause potential problems. Therefore, there is urgent need to develop a therapeutic agent that can minimize the above-described side effects and exhibit a constant therapeutic effect.

RELATED ART DOCUMENT

Patent Document

Korean Patent No. 10-1994802 B1

SUMMARY OF THE INVENTION

The main purpose of the present invention is to provide a stem cell-derived exosome for maximizing therapeutic efficiency for inflammatory macrophage-mediated autoimmune diseases such as rheumatoid arthritis and a pharmaceutical composition for preventing or treating an inflammatory macrophage-mediated autoimmune disease, including the same. However, technical problems to be solved in the present invention are not limited to the above-described problems, and other problems which are not described herein will be fully understood by those of ordinary skill in the art to which the present invention belongs from the following descriptions.

To achieve the purposes of the present invention, the present invention provides a pharmaceutical composition for preventing or treating an inflammatory macrophage-mediated autoimmune disease, which includes a stem cell-derived exosome surface-modified with a sugar compound as an active ingredient.

The present invention also provides a health functional food composition for preventing or improving an inflammatory macrophage-mediated autoimmune disease, which includes a stem cell-derived exosome surface-modified with a sugar compound as an active ingredient.

In addition, the present invention provides a method of preventing or treating an inflammatory macrophage-mediated autoimmune disease, which includes administering a composition including a stem cell-derived exosome surface-modified with a sugar compound as an active ingredient into a subject in need thereof.

Moreover, the present invention provides a use of a stem cell-derived exosome surface-modified with a sugar compound for preventing, improving or treating an inflammatory macrophage-mediated autoimmune disease.

Further, the present invention provides a use of a stem cell-derived exosome surface-modified with a sugar compound for preparing a drug for preventing or treating an inflammatory macrophage-mediated autoimmune disease.

According to one embodiment of the present invention, the sugar compound may be selected from the group consisting of dextran sulfate, hyaluronic acid, chondroitin sulfate, dermatan sulfate, alginate, heparin, glycol-chitosan, mannose and a combination thereof, but the present invention is not limited thereto.

According to another embodiment of the present invention, the sugar compound may be modified with a click compound.

According to still another embodiment of the present invention, the click compound may include cyclooctyne, tetrazine or an analogue thereof as a functional group, but the present invention is not limited thereto.

According to yet another embodiment of the present invention, the stem cell may be one or more types of stem cells selected from the group consisting of adipose tissue stem cells (ASCs), bone marrow stem cells (BMSCs), embryonic stem cells (ESCs), umbilical cord stem cells (UCSCs), dental stem cells (DSCs) and amniotic fluid stem cells (AFSCs).

According to yet another embodiment of the present invention, the inflammatory macrophage-mediated autoimmune disease may be selected from the group consisting of rheumatoid arthritis, juvenile rheumatoid arthritis, adult onset Still's disease, systemic lupus erythematosus, multiple sclerosis, systemic sclerosis, Sjogren's syndrome, primary biliary cirrhosis, celiac disease, inflammatory bowel disease, type I diabetes, autoimmune hemolytic anemia, Goodpasture syndrome, Graves' disease, Hashimoto's thyroiditis, myasthenia gravis, pemphigus and vasculitis.

According to yet another embodiment of the present invention, the exosome may be obtained by a method including (a) treating stem cells with a precursor having an azide group to introduce the azide group on the surface of stem cells; (b) reacting the stem cells with a sugar compound modified with a click compound; and (c) obtaining an exosome surface-modified with the sugar compound from the stem cells.

According to yet another embodiment of the present invention, the precursor having the azide group may be one or more selected from the group consisting of N-azidoacetylmannosamine-tetraacylated (Ac4ManNAz), 6-azido-6-deoxy-N-acetyl-glucosamine-triacylated (Ac3-6AzGlcNAc), N-(4-pentynoyl)-galactosamine-tetraacylated (Ac4GalNAl), N-(4-pentynoyl)-glucosamine-tetraacylated (Ac4GlcNAl), N-(4-pentynoyl)-mannosamine-tetraacylated (Ac4ManNAl), N-azidoacetylgalactosamine-tetraacylated (Ac4GalNAz), N-azidoacetylglucosamine-tetraacylated (Ac4GlcNAz), 6-azide-trehalose (6-TreAz), O-alkyne-trehalose (O-AlkTMM) and 8-azido-3,8-dideoxy-D-manno-octulosonic acid (Kdo Azide), but the present invention is not limited thereto.

According to yet another embodiment of the present invention, the sugar compound modified with the click compound may be selected from the group consisting of dextran sulfate-dibenzocyclooctyne, hyaluronic acid-dibenzocyclooctyne and a combination thereof, but the present invention is not limited thereto.

According to yet another embodiment of the present invention, the step (a) may be to treat 1 to 50 μM of the precursor having an azide group for 1 to 72 hours.

According to yet another embodiment of the present invention, the step (b) may be to react 1 to 50 μM of the sugar compound modified with a click compound with the stem cells for 1 to 72 hours.

According to yet another embodiment of the present invention, the step (c) may include (c-1) replacing the medium with a serum-free medium after the step (b) and culturing the stem cells for 1 to 72 hours; (c-2) recovering a supernatant by centrifuging a cell culture obtained by culturing the stem cells; and (c-3) concentrating the recovered supernatant.

According to yet another embodiment of the present invention, the centrifuging in the step (c-2) may be performed at 1,000 to 5,000×g for 1 to 180 minutes.

According to yet another embodiment of the present invention, the concentrating in the step (c-3) may include filtering the recovered supernatant using a 0.1 to 1-μm filter; and filtering molecules with a size of 300 kDa or less.

According to yet another embodiment of the present invention, the filtration of molecules with a size of 300 kDa or less may be performed by diafiltration using a tangential flow filtration device.

According to yet another embodiment of the present invention, the composition may reduce the concentration of an inflammatory cytokine.

According to yet another embodiment of the present invention, the composition may increase the concentration of an antiinflammatory cytokine.

In addition, the present invention provides a method of preparing an exosome surface-modified to target activated macrophages, which includes: (a) treating stem cells with a precursor having an azide group to introduce the azide group on the surface of stem cells; (b) reacting the stem cells with a sugar compound modified with a click compound; and (c) obtaining an exosome surface-modified with the sugar compound from the stem cells.

In addition, the present invention provides an exosome surface-modified to target activated macrophages, derived from stem cells surface-modified with a sugar compound.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIGS. 5A and 5B show the evaluation of a therapeutic effect after a stem cell-derived exosome (DS-EXO) which is surface-modified with dextran sulfate according to one embodiment of the present invention is administered into a rheumatoid arthritis animal model, in which FIG. 5A shows results of confirming the severity of arthritis (top: an image of comparing arthritis according to the type and concentration of exosome, bottom: graph of comparing therapeutic effects according to the type and concentration of exosome), and FIG. 5B is a graph of comparing concentrations of a blood inflammatory cytokine and an antiinflammatory cytokine.

DETAILED DESCRIPTION OF EXEMPLARY EMBODIMENTS

Figure 1:
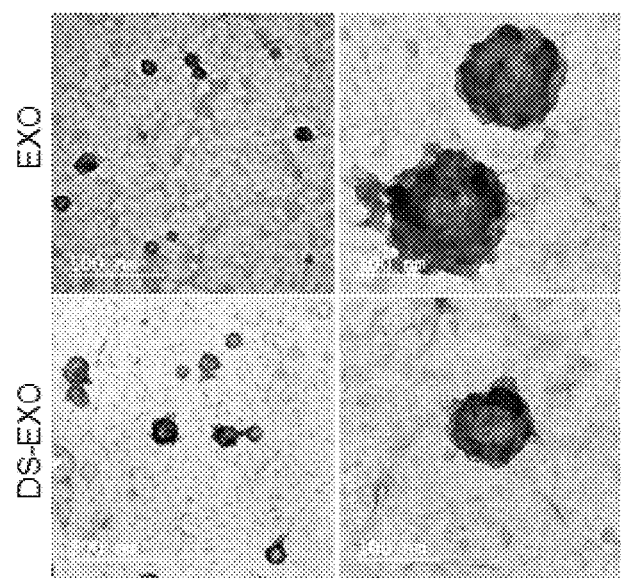
FIG. 1 shows microscopic images (top) and a particle size distribution (bottom) of a stem cell-derived exosome (DS-EXO) which is surface-modified with dextran sulfate and a stem cell-derived exosome (EXO) which is not surface-modified according to one embodiment of the present invention.
Figure 1:
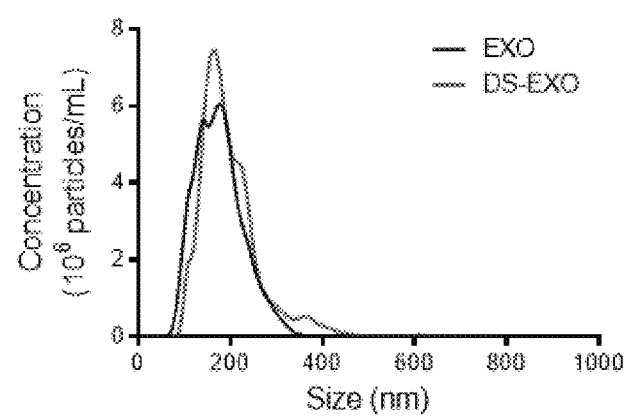

An exosome is a composition generated in in the interaction between cells, various pieces of genetic information and various proteins are contained in a stem cell-derived exosome, and since an exosome is a cell-derived material, it has good biocompatibility and an excellent absorption rate. Accordingly, it is possible to minimize various problems that can be caused by currently used therapeutic agents or side effects caused by stem cells becoming cancerous or cell waste, which can be generated in treatment using stem cells, which is being recently studied. However, common stem cell-derived exosomes have a behavior of indiscriminate accumulation in the liver, and thus limiting the effective treatment of autoimmune diseases. Therefore, the inventors developed a stem cell-derived exosome surface-modified to specifically target inflammatory macrophages, which are main causative cells of an autoimmune disease, and confirmed the therapeutic effect thereof, and thus the present invention was completed.

In one embodiment of the present invention, the surface of a human adipose stem cell or human bone marrow stem cell was modified with dextran sulfate or hyaluronic acid, exosomes secreted therefrom were isolated and purified, and it was confirmed that there was no difference in size and shape from exosomes secreted from unmodified stem cells (see Example 1).

In another embodiment of the present invention, as a result of evaluating the macrophage polarization ability of a stem cell-derived exosome (EXO) and a stem cell-derived exosome surface-modified with dextran sulfate (DS-EXO), in a group treated with $10^8$ stem cell-derived exosomes surface-modified with dextran sulfate, a proportion of inflammatory macrophages (iNOS expression level) was decreased the most, and conversely, the proportion of anti-inflammatory macrophages (CD206 expression level) was increased the most (see Example 2).

In still another embodiment of the present invention, as a result of observing the cell uptake behaviors of a stem cell-derived exosome (EXO) and a stem cell-derived exosome surface-modified with dextran sulfate (DS-EXO), it was confirmed that the cell uptake rate of the stem cell-derived exosome surface-modified with dextran sulfate is significantly high (see Example 3).

In yet another embodiment of the present invention, as a result of evaluating the therapeutic efficiency of the exosome surface-modified with dextran sulfate using a rheumatoid arthritis animal model, compared to the stem cell-derived exosome which is not surface-modified, the exosome surface-modified with dextran sulfate was accumulated in an arthritic lesion for a much longer time, and the concentration of a blood inflammatory cytokine was reduced. Conversely, it was confirmed that the concentration of an antiinflammatory cytokine was increased, and the most excellent arthritis treatment efficacy was exhibited (see Example 4).

In yet another embodiment of the present invention, compared to the exosome which is not surface-modified (EXO), it was confirmed that a hyaluronic acid-modified exosome (HA-EXO) and a dextran sulfate-modified exosome (DS-EXO) show a more effective cell phagocytic behavior (see Example 5).

Accordingly, the present invention may provide a pharmaceutical composition for preventing or treating an inflammatory macrophage-mediated autoimmune disease, which includes a stem cell-derived exosome surface-modified with a sugar compound as an active ingredient.

As another aspect of the present invention, the present invention may provide a health functional food composition for preventing or improving an inflammatory macrophage-mediated autoimmune disease, which includes a stem cell-derived exosome surface-modified with a sugar compound as an active ingredient.

The term "inflammatory macrophage" used herein refers to a classically-activated macrophage which typically causes inflammation, and as an example, a representative macrophage is an M1-type macrophage (M1-type polarized macrophage). The M1 macrophages serve to recognize and remove external organisms, bacteria or viruses, which is a generally known functional feature of macrophages, and effectively kill and block cancer cells. The M1 macrophages may be differentiated by cytokines such as interferon gamma (IFN-γ) derived from CD8 T cells and natural killer cells (NK cells), and may mature or be differentiated by recognizing a cell membrane component such as lipopolysaccharide (LPS) generated in apoptosis of infected cells. In addition, the M1 macrophages express proteins such as MHC II, CD80 and CD86, which leads to adaptive immune responses. The activated M1-type macrophages produce and secrete inflammatory cytokines such as IL-1β and tumor necrosis factor alpha (TNF-α). In the present invention, the term "inflammatory macrophages" encompasses M1-type macrophages.

The term "exosome" used herein refers to a cell-derived vesicle present in almost all eukaryotic cell fluids including blood, urine and cell cultures, and is known to have a diameter of 30 to 100 nm on average. Since it has been reported that exosomes are secreted by fusion of the multi-vesicular body of cells to the plasma membrane or directly secreted from the plasma membrane, and play a specific important role in aggregation, intracellular signaling and cellular waste management, exosomes are clinically attracting attention as biomarkers for diagnosing and treating specific diseases.

In the present invention, the exosomes may be naturally secreted from stem cells after the stem cells have been cultured. The stem cells may be one or more types selected from the group consisting of adipose tissue stem cells (ASCs), bone marrow stem cells (BMSCs), embryonic stem cells (ESCs), umbilical cord stem cells (UCSCs), dental stem cells (DSCs) and amniotic fluid stem cells (AFSCs), and more specifically, ASCs or BMSCs.

In the present invention, the sugar compound is for specifically targeting inflammatory macrophages, and specifically, may be selected from the group consisting of dextran sulfate, hyaluronic acid, chondroitin sulfate, dermatan sulfate, alginate, heparin, glycol-chitosan, mannose and a combination thereof, and preferably, dextran sulfate or hyaluronic acid.

In the present invention, the sugar compound may be modified with a click compound.

The term "click compound" used herein is the generic term for compounds that can be used in click chemistry, and the "click chemistry" includes various groups of chemical reactions which are characterized by having properties such as rapidity, regioselectivity and a high yield and generally a high thermodynamic driving force of 20 kcal/mol or more.

In the present invention, the click compound may include cyclooctyne, tetrazine, or an analogue there of as a functional group, and such a functional group allows a sugar compound for targeting the inflammatory macrophage to be used in copper-free click chemistry. In one embodiment, the sugar compound may be modified with a click compound, that is, dibenzocyclooctyne.

In the present invention, the analogue of cyclooctyne or tetrazine may be, for example, dibenzocyclooctyne-amine, dibenzocyclooctyne-acid, dibenzocyclooctyne-N-hydroxysuccinimidyl ester, (4-(1,2,4,5-tetrazin-3-yl)phenyl)methanamine, or trans-cyclooctyne-amine, but the present invention is not limited thereto.

In the present invention, the inflammatory macrophage-mediated autoimmune disease may be rheumatoid arthritis, juvenile rheumatoid arthritis, adult onset Still's disease, systemic lupus erythematosus, multiple sclerosis, systemic sclerosis, Sjogren's syndrome, primary biliary cirrhosis, celiac disease, inflammatory bowel disease, type I diabetes, autoimmune hemolytic anemia, Goodpasture syndrome, Graves' disease, Hashimoto's thyroiditis, myasthenia gravis, pemphigus or vasculitis, and preferably, rheumatoid arthritis, but the present invention is not limited thereto.

In the present invention, the exosomes may be obtained by a method including (a) treating stem cells with a precursor having an azide group to introduce the azide group on the surface of stem cells; (b) reacting the stem cells with a sugar compound modified with a click compound; and (c) obtaining an exosome surface-modified with the sugar compound from the stem cells. Through the above steps, the surface of stem cells may be modified with a sugar compound, for example, dextran sulfate or hyaluronic acid, and exosomes secreted from the surface-modified stem cells can specifically target activated and/or inflammatory macrophages.

In the present invention, the precursor having an azide group may be a precursor involved in glycosylation of the stem cells. In one embodiment, the precursor having an azide group may be N-azidoacetylmannosamine-tetraacylated (Ac4ManNAz), and other than the N-azidoacetylmannosamine-tetraacylated, preferable examples of precursors with an azide group that can be introduced on the surface of stem cells to obtain exosomes according to the present invention may include 6-azido-6-deoxy-N-acetyl-glucosamine-triacylated (Ac3-6AzGlcNAc), N-(4-pentynoyl)-galactosamine-tetraacylated (Ac4GalNAl), N-(4-pentynoyl)-glucosamine-tetraacylated (Ac4GlcNAl), N-(4-pentynoyl)-mannosamine-tetraacylated (Ac4ManNAl), N-azidoacetylgalactosamine-tetraacylated (Ac4GalNAz), N-azidoacetylglucosamine-tetraacylated (Ac4GlcNAz), 6-azide-trehalose (6-TreAz), O-alkyne-trehalose (O-AlkTMM), and 8-azido-3,8-dideoxy-D-manno-octulosonic acid (Kdo Azide), but the present invention is not limited thereto.

In the present invention, the click compound-modified sugar compound may be selected from the group consisting of dextran sulfate-dibenzocyclooctyne, hyaluronic acid-dibenzocyclooctyne and a combination thereof, but the present invention is not limited thereto.

In the present invention, the step (a) may be to treat 1 to 50 μM of a precursor having an azide group for 1 to 72 hours. For example, 20 μM of N-azidoacetylmannosamine-tetraacylated (Ac4ManNAz) may be treated for 48 hours, but the present invention is not limited thereto.

In the present invention, the step (b) may be to react 1 to 50 μM of the click compound-modified sugar compound with stem cells for 1 to 72 hours. For example, 10 μM of dextran sulfate-dibenzocyclooctyne may be reacted with stem cells for 2 hours, but the present invention is not limited thereto.

In the present invention, the step (c) may include (c-1) replacing the medium with a serum-free medium after the step (b) to culture the stem cells for 1 to 72 hours; (c-2) recovering a supernatant by centrifuging the cell culture obtained by culturing the stem cells; and (c-3) concentrating the recovered supernatant. Here, the centrifugation in the step (c-2) may be performed at 1,000 to 5,000×g for 1 to 180 minutes. For example, a supernatant may be obtained by centrifuging the cell culture obtained by culturing the stem cells at 3,000×g for 20 minutes.

In the present invention, the concentration in the step (c-3) may include filtering the recovered supernatant through a 0.1 to 1-μm filter; and filtering molecules with a size of 300 kDa or less. Here, the filtration of molecules with a size of 300 kDa or less may be performed by diafiltration using a tangential flow filtration device. For example, the recovered supernatant may be filtered using a 0.22-μm filter, and then exosomes may be concentrated by a tangential flow filtration device using a 300-kDa filter.

In the present invention, the composition may decrease the concentration of an inflammatory cytokine or increase the concentration of an antiinflammatory cytokine. Here, cytokines decreased in concentration by treating or administering a composition including a stem cell-derived exosome surface-modified with a sugar compound, and more particularly, dextran sulfate or hyaluronic acid as an active ingredient to target an activated macrophage of the present invention include IFN-γ, tumor necrosis factor alpha (TNF-α), interleukin (IL)-6, IL-17A, a granulocyte colony-stimulating factor (G-CSF), a granulocyte-macrophage colony-stimulating factor (GM-CSF) and IL-1β, and cytokines increased in concentration include IL-4 and IL-10.

Meanwhile, a content of the active ingredient in the composition of the present invention may be suitably adjusted according to symptoms of a disease, the degree of progression of symptoms, or the condition of a patient, and may be, for example, 0.0001 to 99.9 wt %, or 0.001 to 50 wt % based on the total content of the composition, but the present invention is not limited thereto. The content ratio is a value obtained based on a dry content after removal of a solvent.

The pharmaceutical composition according to the present invention may further include suitable carrier, excipient and diluent, which are conventionally used in preparation of a pharmaceutical composition. For example, the excipient may be one or more selected from the group consisting of a diluent, a binder, a disintegrant, a lubricant, an adsorbent, a humectant, a film-coating material, and a controlled-release additive.

The pharmaceutical composition according to the present invention may be formulated in the form of a powder, a granule, a suspended-release granule, an enteric granule, a solution and a liquid, an ophthalmic solution, an elixir, an emulsion, a suspension, a spirit, a troche, an aromatic water, a lemonade, a tablet, a suspended-release tablet, an enteric tablet, a sublingual tablet, a hard capsule, a soft capsule, a suspended-release capsule, an enteric capsule, a pill, a tincture, a concentrate extract, a dry extract, a fluid extract, an injection, a capsule, a capsule, a perfusate, a plaster, a lotion, a paste, a spray, an inhalant, a patch, a sterile injection, or an external preparation such as an aerosol according to a conventional method, and the external preparation may have a formulation such as a cream, a gel, a patch, a spray, an ointment, a plaster, a lotion, a liniment, a liniment, a paste or a cataplasma.

The carrier, excipient and diluent which may be included in the pharmaceutical composition according to the present invention may include lactose, dextrose, sucrose, an oligosaccharide, sorbitol, mannitol, xylitol, erythritol, maltitol, starch, acacia gum, alginate, gelatin, calcium phosphate, calcium silicate, cellulose, methyl cellulose, microcrystalline cellulose, polyvinyl pyrrolidone, water, methylhydroxybenzoate, propylhydroxybenzoate, talc, magnesium stearate and mineral oil.

For preparation, a generally used diluent or excipient such as a filler, an extender, a binder, a wetting agent, a disintegrant or a surfactant is used.

As an additive for the tablet, powder, granule, capsule, pill or troche according to the present invention, an excipient such as corn starch, potato starch, flour starch, lactose, sucrose, glucose, fructose, di-mannitol, precipitated calcium carbonate, synthetic aluminum silicate, calcium monohydrogen phosphate, calcium sulfate, sodium chloride, sodium hydrogen carbonate, refined lanolin, microcrystalline cellulose, dextrin, sodium alginate, methylcellulose, sodium carboxymethyl cellulose, kaolin, urea, colloidal silica gel, hydroxypropyl starch, hydroxypropyl methylcellulose (HPMC), HPMC1928, HPMC2208, HPMC2906, HPMC2910, propylene glycol, casein, calcium lactate or Primojel; a binder such as gelatin, gum arabic, ethanol, agar powder, cellulose acetate phthalate, carboxymethyl cellulose, carboxymethyl cellulose calcium, glucose, purified water, sodium caseinate, glycerin, stearic acid, carboxymethylcellulose, sodium methylcellulose, methyl cellulose, microcrystalline cellulose, dextrin, hydroxycellulose, hydroxypropyl starch, hydroxymethyl cellulose, purified shellac, starch powder, hydroxypropyl cellulose, hydroxypropyl methylcellulose, polyvinyl alcohol or polyvinylpyrrolidone; a disintegrant such as hydroxypropyl methylcellulose, corn starch, agar powder, methylcellulose, bentonite, hydroxypropyl starch, sodium carboxymethylcellulose, sodium alginate, calcium carboxymethylcellulose, calcium citrate, sodium lauryl sulfate, silicic anhydride, 1-hydroxypropyl cellulose, dextran, an ion exchange resin, polyvinyl acetate, formaldehyde-treated casein and gelatin, alginic acid, amylose, guar gum, sodium bicarbonate, polyvinylpyrrolidone, calcium phosphate, gelled starch, gum arabic, amylopectin, pectin, sodium polyphosphate, ethyl cellulose, sucrose, magnesium aluminum silicate, a di-sorbitol solution or light anhydrous silicic acid; or a lubricant such as calcium stearate, magnesium stearate, stearic acid, hydrogenated vegetable oil, talc, lycopodite, kaolin, petrolatum, sodium stearate, cacao butter, sodium salicylate, magnesium salicylate, polyethylene glycol (PEG) 4000, PEG 6000, liquid paraffin, hydrogenated soybean oil (Lubri wax), aluminum stearate, zinc stearate, sodium lauryl sulfate, magnesium oxide, Macrogol, synthetic aluminum silicate, silicic anhydride, a higher fatty acid, a higher alcohol, silicon oil, paraffin oil, polyethylene glycol fatty acid ether, starch, sodium chloride, sodium acetate, sodium oleate, dl-leucine or light anhydrous silicic acid may be used.

As an additive for the liquid according to the present invention, water, diluted hydrochloric acid, diluted sulfuric acid, sodium citrate, sucrose monostearate, polyoxyethylene sorbitol fatty acid ester (Tween ester), polyoxyethylene monoalkyl ether, lanolin ether, lanolin ester, acetic acid, hydrochloric acid, aqueous ammonia, ammonium carbonate, potassium hydroxide, sodium hydroxide, prolamin, polyvinylpyrrolidone, ethyl cellulose, or sodium carboxymethylcellulose may be used.

For the syrup according to the present invention, a sucrose solution, another saccharide or a sweetener may be used, and if necessary, an aromatic agent, a coloring agent, a preservative, a stabilizer, a suspending agent, an emulsifier or a thickening agent may be used.

For a liquid according to the present invention, purified water may be used, and if necessary, an emulsifier, a preservative, a stabilizer or an aromatic agent may be used.

For the suspension according to the present invention, a suspending agent such as gum acacia, tragacanth, methyl cellulose, carboxymethyl cellulose, sodium carboxymethyl cellulose, microcrystalline cellulose, sodium alginate, hydroxypropyl methylcellulose, 1828, 2906 or 2910 may be used, and if necessary, a surfactant, a preservative, a stabilizer, a coloring agent or an aromatic agent may be used.

For the injection according to the present invention, a solvent such as distilled water for injection, a 0.9% sodium chloride injection, a Ringer's solution, a dextrose injection, a dextrose+sodium chloride injection, PEG, lactated Ringer's solution, ethanol, propylene glycol, non-volatile oil-sesame oil, cottonseed oil, peanut oil, soybean oil, corn oil, ethyl oleate, isopropyl myristic acid or benzene benzoate; a solubilizer such as sodium benzoate, sodium salicylate, sodium acetate, urea, urethane, monoethylacetamide, butazolidine, propylene glycol, Tween, nicotinic acid amide, hexamine or dimethylacetamide; a buffer such as a weak acid and a salt thereof (acetic acid and sodium acetate), a weak base and a salt thereof (ammonia and ammonium acetate), an organic compound, a protein, albumin, peptone or a gum; an isotonic agent such as sodium chloride; a stabilizer such as sodium bisulfite ($NaHSO_3$) carbon dioxide gas, sodium metabisulfite ($Na_2S_2O_5$), sodium sulfite ($Na_2SO_3$), nitrogen gas ($N_2$) or ethylenediamine tetraacetic acid; an antioxidant agent such as sodium bisulfide 0.1%, sodium formaldehyde sulfoxylate, thiourea, disodium ethylenediaminetetraacetic acid or acetone sodium bisulfite; a pain-relieving agent such as benzyl alcohol, chlorobutanol, procaine hydrochloride, glucose or calcium gluconate; or a suspending agent such as CMC Na, sodium alginate, Tween 80 or aluminum monostearate may be used.

For the suppository according to the present invention, a base material such as cacao butter, lanolin, Witepsol, polyethylene glycol, glycerolgelatin, methyl cellulose, carboxymethyl cellulose, a mixture of stearic acid and oleic acid, Subanal, cottonseed oil, peanut oil, palm oil, cacao butter+cholesterol, lecithin, Lanette wax, glycerol monostearate, tween or span, Imhausen, monolene (propylene glycol monostearate, glycerin, (Adeps solidus), Buytyrum Tego-G, Cebes Pharma 16, Hexride base 95, Cotomar, Hydrokote SP, S-70-XXA, S-70-XX75 (S-70-XX95), Hydrokote 25, Hydrokote 711, Idropostal, Massa estrarium A, AS, B, C, D, E, I o T, Massa-MF, Masupol, Masupol-15, neosuppostal-N, Paramount-B, Supposiro (OSI, OSIX, A, B, C, D, H, L), suppository base IV types (AB, B, A, BC, BBG, E, BGF, C, D, 299), Suppostal (N, Es), Wecoby (W, R, S, M, Fs), or Tegester triglyceride matter (TG-95, MA, 57) may be used.

A solid preparation for oral administration may be a tablet, a pill, a powder, a granule or a capsule, and prepared by mixing at least one or more excipients, for example, starch, calcium carbonate, sucrose, lactose and gelatin. In addition, in addition to the simple excipients, lubricants such as magnesium stearate and talc may also be used.

A liquid preparation for oral administration may be a suspension, a liquid for internal use, an emulsion or a syrup, and a generally-used simple diluent such as water or liquid paraffin, as well as various types of excipients, for example, a wetting agent, a sweetener, a fragrance and a preservative may be included. A preparation for parenteral administration may be a sterilized aqueous solution, a non-aqueous solvent, a suspension, an emulsion, a lyophilizing agent or a suppository. As the non-aqueous solvent or suspension, propylene glycol, polyethylene glycol, a vegetable oil such as olive oil, or an injectable ester such as ethyl oleate may be used.

The pharmaceutical composition of the present invention is administered at a pharmaceutically effective amount. The "pharmaceutically effective amount" used herein refers to an amount sufficient for treating a disease at a reasonable benefit/risk ratio applicable for medical treatment, and an effective dosage may be determined by parameters including the type of a patient's disease, severity, drug activity, sensitivity to a drug, administration time, an administration route and an excretion rate, the duration of treatment and drugs simultaneously used, and other parameters well known in the medical field.

The pharmaceutical composition of the present invention may be administered separately or in combination with other therapeutic agents, and may be sequentially or simultaneously administered with a conventional therapeutic agent, or administered in a single or multiple dose(s). In consideration of all of the above-mentioned parameters, it is important to achieve the maximum effect with the minimum dose without a side effect, and such a dose may be easily determined by one of ordinary skill in the art.

The pharmaceutical composition of the present invention may be administered into a subject via various routes. All administration routes may be expected, and the pharmaceutical composition of the present invention may be administered by, for example, oral administration, subcutaneous injection, intraperitoneal administration, intravenous, intramuscular or intrathecal injection, sublingual administration, buccal administration, rectal insertion, vaginal insertion, ocular administration, ear administration, nasal administration, inhalation, spraying through the mouth or nose, skin administration, or transdermal administration.

The pharmaceutical composition of the present invention is determined by the type of drug which is an active ingredient, as well as various related factors such as a disease to be treated, an administration route, a patient's age, gender, body weight and the severity of a disease.

The term "subject" used herein refers to a target in need of treatment, and more specifically, a mammal such as a human, a non-human primate, a mouse, a rat, a dog, a cat, a horse or a cow.

In the present invention, administration refers to providing the composition of the present invention to a subject by any suitable method.

The "prevention" used herein refers to all actions of prevention inhibiting or delaying symptoms generated by a target disease, and the "treatment" used herein refers to all actions involved in improving or beneficially changing symptoms of a target disease and a metabolic disorder thereby by the administration of the pharmaceutical composition according to the present invention, and the "improvement" refers to all actions decreasing parameters related to a target disease, for example, the severity of symptoms, by administration of the composition according to the present invention.

In the health functional food composition of the present invention, the active ingredient may be directly added to food or used together with other food or food ingredients, and may be suitably used according to a conventional method. The mixing amount of the active ingredient may be suitably determined according to the purpose of use thereof. Generally, in the production of food or beverages, the composition of the present invention is added at 15 wt % or less, and preferably 10 wt % or less with respect to the raw materials. However, in long-term consumption for health and hygiene or health control, the amount of the composition may be the same as or lower than the above-mentioned range.

The health functional food composition of the present invention has no limitation to components, other than containing the active ingredient as an essential component at an indicated proportion, and may contain various flavoring agents or natural carbohydrates like a conventional beverage. Examples of the above-mentioned natural carbohydrates include conventional sugars, for example, monosaccharides such as glucose, fructose, etc.; disaccharides such as maltose, sucrose, etc.; and polysaccharides such as dextrin, cyclodextrin, etc., and sugar alcohols such as xylitol, sorbitol, erythritol, etc. As the sweeteners, natural sweeteners [thaumatin, stevia extract (e.g., rebaudioside A, glycyrrhizin, etc.)] and synthetic sweeteners (saccharin, aspartame, etc.) may be advantageously used. The proportion of the natural carbohydrate may be suitably determined by the choice of those of ordinary skill in the art.

In addition to the above ingredients, the health functional food composition of the present invention may contain various nutrients, vitamins, minerals (electrolytes), flavoring agents including synthetic and natural flavoring agents, coloring agents, fillers (cheese, chocolate, etc.), pectic acid and a salt thereof, alginic acid and a salt thereof, organic acids, protective colloidal thickening agents, pH adjustors, stabilizers, preservatives, glycerin, alcohols, or carbonizing agents used in soda, and such components may be used independently or in combination. Proportions of such additives may also be suitably selected by those of ordinary skill in the art.

As still another aspect of the present invention, the present invention may provide a method of preparing an exosome surface-modified to target an activated macrophage, and the method includes the following steps:

(a) treating stem cells with a precursor having an azide group to introduce the azide group on the surface of stem cells;

(b) reacting the stem cells with a sugar compound modified with a click compound; and (c) obtaining an exosome surface-modified with the sugar compound from the stem cells.

As yet another aspect of the present invention, the present invention may provide an exosome surface-modified to target an activated macrophage, derived from stem cells surface-modified with a sugar compound. The exosome may be an exosome prepared by the preparation method according to the present invention.

Terms and words used in the specification and claims should not be construed as limited to general or dictionary terms meanings, and should be interpreted with the meaning and concept in accordance with the technical idea of the present invention based on the principle that the inventors have appropriately defined the concepts of terms in order to explain the invention in the best way.

Hereinafter, to help in understanding the present invention, exemplary examples will be suggested. However, the following examples are merely provided to more easily understand the present invention, and not to limit the present invention.

EXAMPLES

Example 1. Preparation and Morphological Analysis of Stem Cell-Derived Exosome Surface-Modified to Target Activated Macrophage Stem cell-derived exosomes surface-modified to target an activated macrophage and/or M1-type macrophage were extracted in the process of culturing human adipose stem cells or human bone marrow stem cells.

First, dextran sulfate (1,000 mg, 0.025 mmol) and dibenzocyclooctyne-amine (691 mg, 2.5 mmol) were dissolved in 50 ml of an acetate buffer (acetate buffer, pH 5.6), and $NaBH_3CN$ (157.1 mg, 2.5 mmol) was added and reacted at 50° C. for 5 days. A reactant was purified with a water/methanol mixed solution (1 v/3 v to 1 v/1 v) for 2 days and distilled water for 2 days using a dialysis tube (MW.=3.5 kDa; Spectrum Laboratories, Inc., U.S.A.). Afterward, the final dextran sulfate-dibenzocyclooctyne was obtained by freeze-drying. Hyaluronic acid-dibenzocyclooctyne was also prepared in the same manner as described above.

Subsequently, human adipose stem cells or human bone marrow stem cells were incubated in a medium containing 20 µM of Ac4ManNAz (N-azidoacetylmannosamine-tetraacylated; Click Chemistry Tools, Cat #: 1084, U.S.A.) for 48 hours, and then a chemical reaction was allowed to occur for 2 hours in a serum-free medium containing 10 µM of the pre-synthesized dextran sulfate-dibenzocyclooctyne or hyaluronic acid-dibenzocyclooctyne.

Afterward, the medium was replaced again with a serum-free medium and cultured for 24 hours, followed by recovery of a cell culture supernatant. The recovered cell culture supernatant was first centrifuged at 3,000×g and 4° C. for 20 minutes, and then filtered through a 0.22-µm filter to remove cell debris and waste. Afterward, exosomes were isolated and purified from the recovered supernatant by a tangential flow filtration (TFF) system using a 300 kDa filter.

As a result of analyzing particle sizes and morphology before and after modification of exosomes surface-modified with dextran sulfate (DS-EXO) extracted in the proliferation of stem cells as described above, as shown in FIG. 1, it was confirmed that there is no significant difference in both of particle sizes and morphology before and after modification. In addition, as a result of ELISA, 20,811±4,261 dextran sulfates were attached to the exosome.

From this result, it can be expected that the exosomes surface-modified with dextran sulfate will have similar physical properties to the unmodified exosomes, and it has been confirmed that even if the surface is modified, functional defects caused by morphological abnormalities will not be shown due to having the size and morphology of a typical exosome. The exosomes surface-modified with dextran sulfate, extracted as described above, were used as a composition for treating rheumatoid arthritis.

Example 2. Evaluation of Macrophage Polarization of Exosomes Surface-Modified With Dextran Sulfate To evaluate the macrophage polarization ability of exosomes surface-modified with dextran sulfate, Raw264.7 cells were incubated in a medium containing lipopolysaccharide (LPS) and IFN-γ for 24 hours, and then surface-modified exosomes and unmodified exosomes were treated by concentration and incubated. At 48 hours after exosome treatment, the cells were fixed with a 4% neutral buffered formalin (NBF) solution, increased in cell membrane permeability using a 0.2% Triton X-100 solution, and then treated with an antibody specific for an iNOS protein, which is a marker for an inflammatory macrophage, and an antibody specific for a CD206 protein, which is a marker for an antiinflammatory macrophage, at 4° C. for 8 hours. Afterward, the macrophage polarization ability of the exosomes surface-modified with dextran sulfate was comparatively evaluated using confocal microscopy and flow cytometry.

Figure 2:
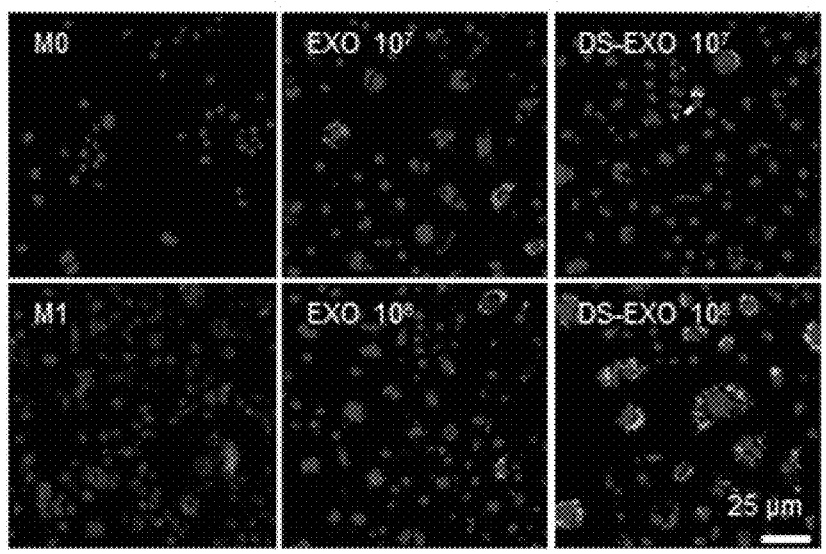
FIG. 2 shows confocal microscopic images (top) and a flow cytometry result (bottom) confirming proportions of inflammatory macrophages and antiinflammatory macrophages by treatment of each exosome by concentration ($10^7$ and $10^8$) to evaluate macrophage polarization ability of a stem cell-derived exosome (DS-EXO) which is surface-modified with dextran sulfate and a stem cell-derived exosome (EXO) which is not surface-modified according to one embodiment of the present invention.
Figure 2:
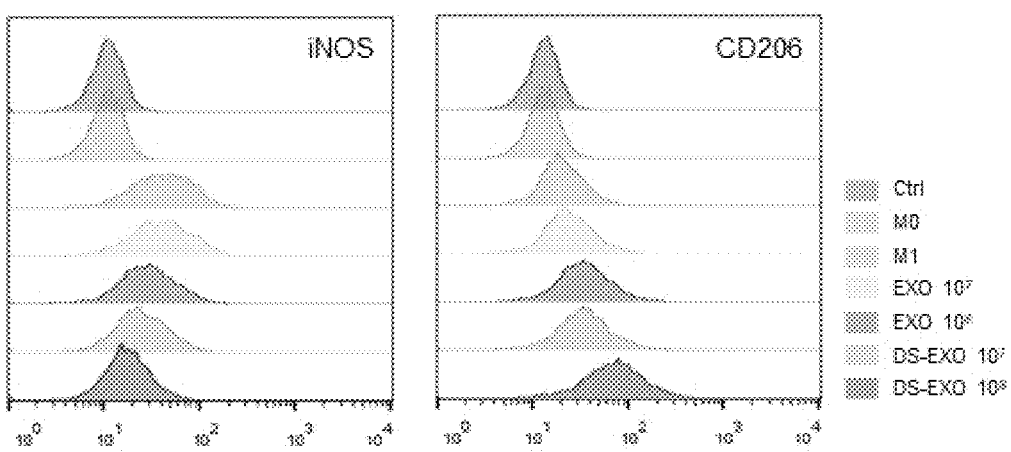

As a result of evaluating the macrophage polarization ability of stem cell-derived exosomes (EXO) as a control and stem cell-derived exosomes surface-modified with dextran sulfate (DS-EXO), as shown in FIG. 2, it was confirmed that, in the group treated with $10^8$ stem cell-derived exosomes surface-modified with dextran sulfate, the proportion of inflammatory macrophages (iNOS expression level) was decreased the most, and conversely, the proportion of anti-inflammatory macrophages (CD206 expression level) was increased the most.

Example 3. Evaluation of Macrophage Targeting Ability of Exosome Surface-Modified With Dextran Sulfate Next, fluorescence-stained exosomes were administered to a rheumatoid arthritis-induced animal model, and immunohistochemistry was performed on joint tissue sections to evaluate macrophage targeting ability. Specifically, the surface-modified exosomes were mixed with Cy5.5-NHS in a weight ratio of 100:1 and stirred at 4° C. for 8 hours, and then an unreacted dye was purified using a PD-10 column (GE Healthcare, Cat #: 17085101, U.S.A.). Unmodified exosomes were also fluorescently stained in the same manner. To evaluate an in vivo biodistribution, after the fluorescence-stained exosomes were intravenously injected, a fluorescence intensity was measured using an IVIS® imaging system at 1, 3, 6, 9, 12 and 24 hours. After the final measurement, the mouse was euthanized, the major organs and joints were removed, fixed with a 4% NBF solution, and embedded in paraffin, thereby preparing a 5-µm-thick tissue section. After the paraffin fragment was subjected to deparaffination and protein retrieval, it was treated with an antibody specific for scavenger receptor class A (SR-A), which is a marker for macrophages, for fluorescent staining. The stained sections were observed with a fluorescence microscope to compare and evaluate the targeting ability of the modified exosomes.

Figure 3:
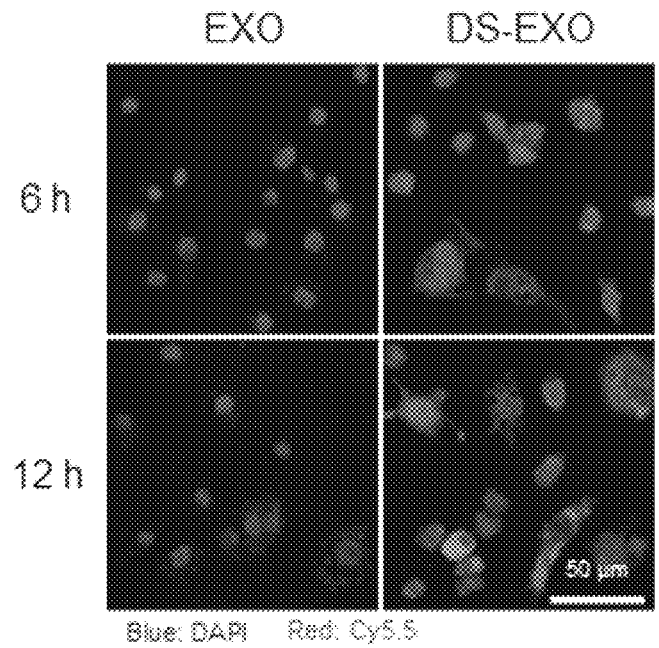
FIG. 3 shows fluorescent microscopic images (top) obtained by intravenously injecting a stem cell-derived exosome (DS-EXO) which is surface-modified with dextran sulfate according to one embodiment of the present invention into a mouse, extracting the main organs and joints, and staining them and a graph (bottom) obtained by comparing fluorescence intensity by time (3, 6, 9 and 12 hours) with a stem cell-derived exosome (EXO) which is not surface-modified.
Figure 3:
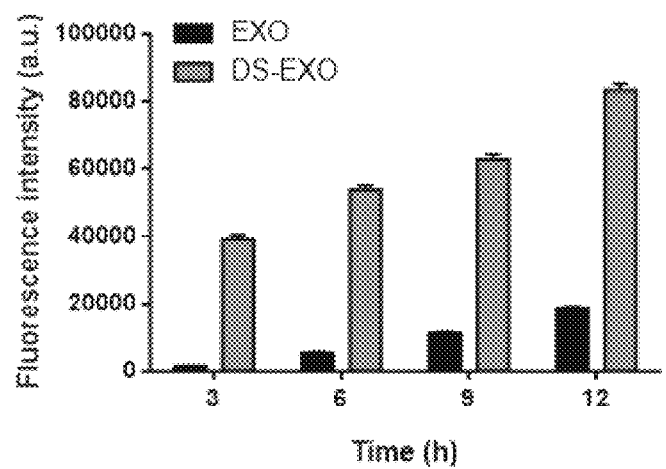

As a result of observing the time-dependent cell uptake behaviors of stem cell-derived exosomes (EXO) as a control and stem cell-derived exosomes surface-modified with dextran sulfate (DS-EXO) with respect to macrophages, as confirmed in FIG. 3, it was confirmed that the cell uptake rate of the stem cell-derived exosomes surface-modified with dextran sulfate was significantly high in all time zones (3, 6, 9 and 12 hours).

Example 4. Evaluation of Therapeutic Efficacy of Exosome Surface-Modified With Dextran Sulfate Using Rheumatoid Arthritis Animal Model To evaluate the therapeutic efficacy of a composition for treating rheumatoid arthritis, which includes the exosome surface-modified with dextran sulfate according to the present invention, a rheumatoid arthritis-induced animal model was used. To construct a rheumatoid arthritis animal model, a solution prepared by mixing complete Freund's adjuvant (CFA; Chondrex, Cat #: A0023, U.S.A.) and immunization grade bovine type II collagen (Chondrex, Cat #: A0013) in a ratio of 1:1 was administered into a DBA1/J mouse, and three weeks later, a solution prepared by mixing incomplete Freund's adjuvant (IFA; Chondrex, Cat #: A0027) and immunization grade bovine type II collagen in a 1:1 ratio was administered into the mouse. Afterward, a composition including an exosome surface-modified with dextran sulfate was intravenously injected into the mouse to confirm a rheumatoid arthritis therapeutic effect. To confirm the therapeutic effect caused by exosomes surface-modified with dextran sulfate, for two weeks after exosome treatment, the severity of arthritis was evaluated, and a rheumatoid arthritis therapeutic effect was confirmed using a cytokine enzyme-linked immunosorbent assay (ELISA) by collecting blood, and performing centrifugation (4500 rpm, 15 min) to obtain a serum, which is a supernatant. In addition, for visual inspection and histopathological examination, joints were removed, fixed with a 4% NBF solution and embedded in paraffin, followed by preparation of a 5-μm-thick tissue section. For comparison of histological findings, the corresponding tissue sections were stained with hematoxylin and eosin (H&E) and observed under an optical microscope. In addition, to compare the polarization of macrophages in joint tissue, the corresponding tissue sections were treated with each of an antibody specific for an iNOS protein, which is a marker for an inflammatory macrophage, and an antibody specific for a CD206 protein, which is a marker for an antiinflammatory macrophage. By comparing the degree of damage to the joint tissue and the polarization of macrophages, a rheumatoid arthritis therapeutic effect was confirmed.

Figure 4:
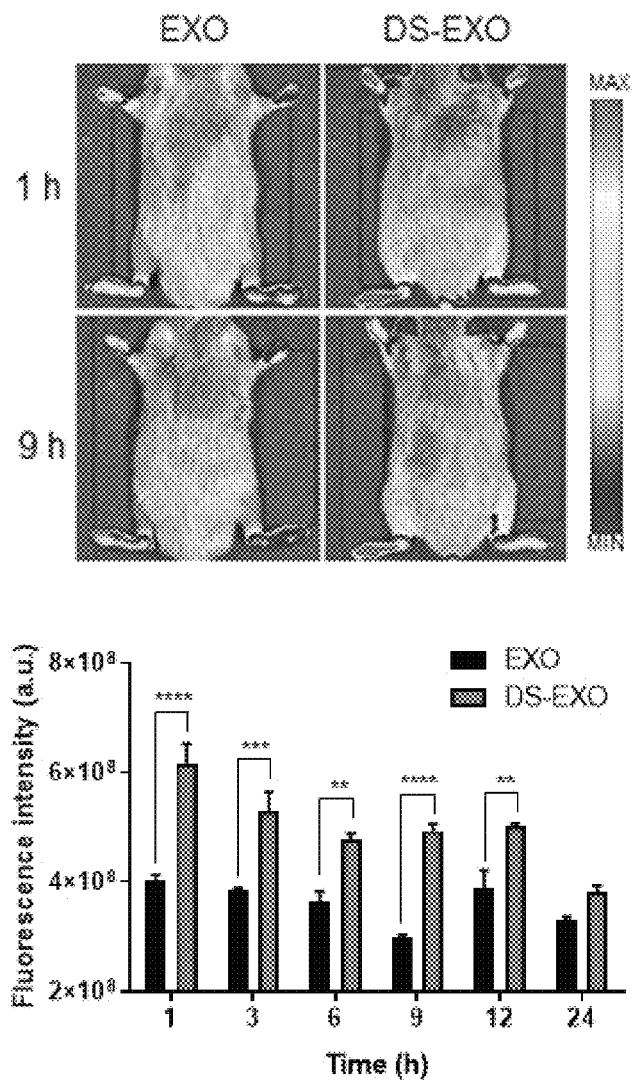
FIG. 4 shows an image (top) and a fluorescence intensity comparison graph (bottom), obtained by evaluating an in vivo distribution behavior after a stem cell-derived exosome (DS-EXO) which is surface-modified with dextran sulfate according to one embodiment of the present invention is administered into a rheumatoid arthritis animal model.

First, as a result of observing the time-dependent in vivo biodistribution behavior of stem cell-derived exosomes (EXO) as a control and stem cell-derived exosomes (DS-EXO) surface-modified with dextrin sulfate for rheumatoid arthritis animal models, as shown in FIG. 4, it was confirmed that the stem cell-derived exosomes surface-modified with dextran sulfate are accumulated in an arthritic lesion for a much longer time.

Figure 5A:
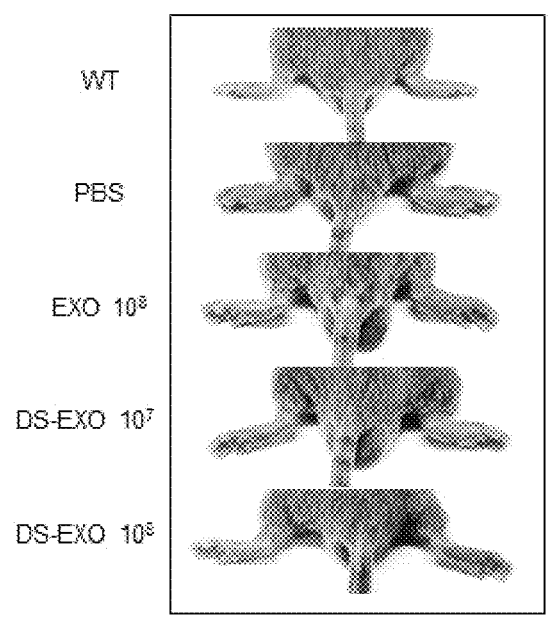
Figure 5A:
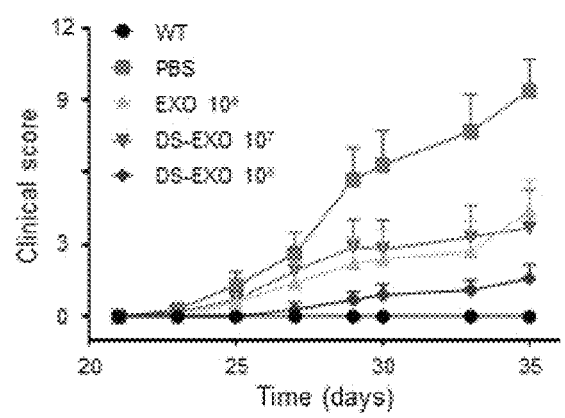
Figure 5B:
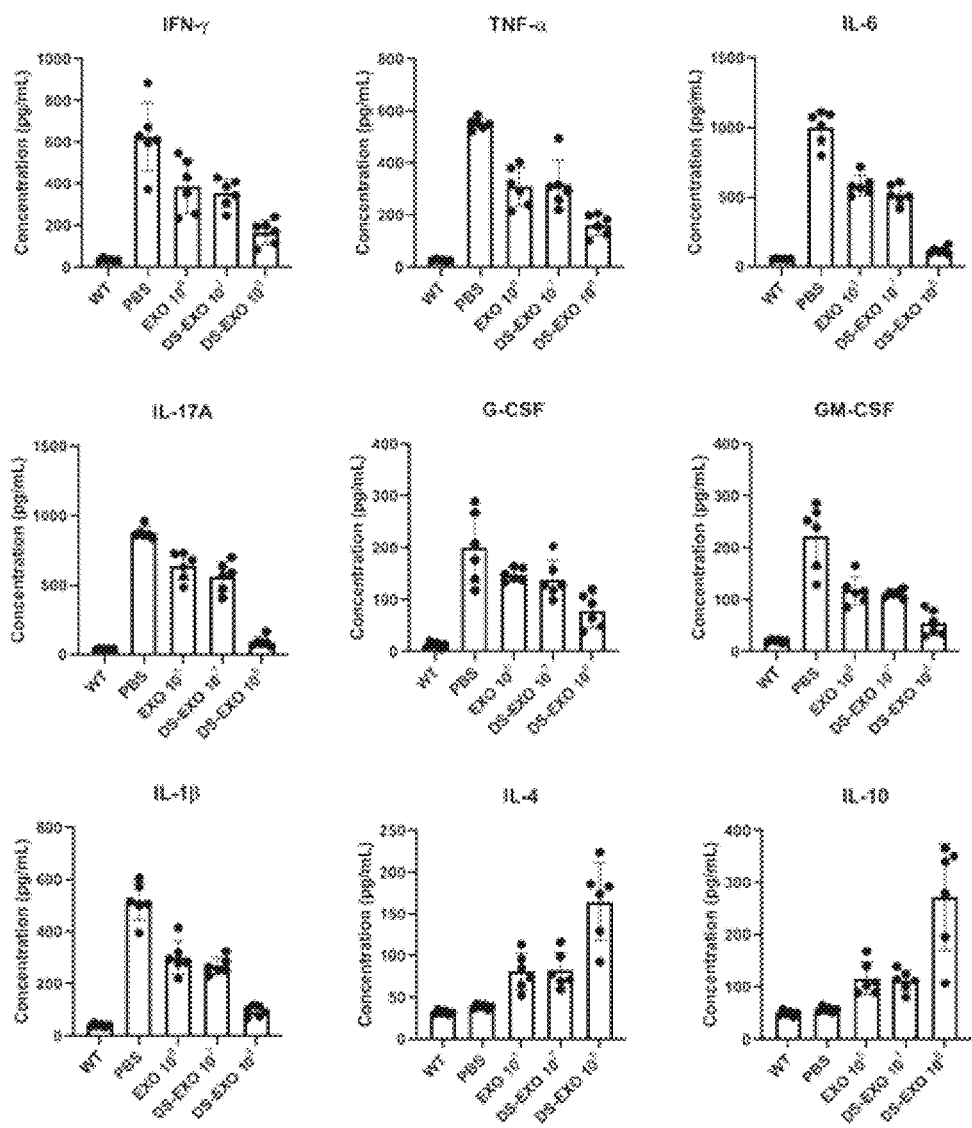
Figure 6:
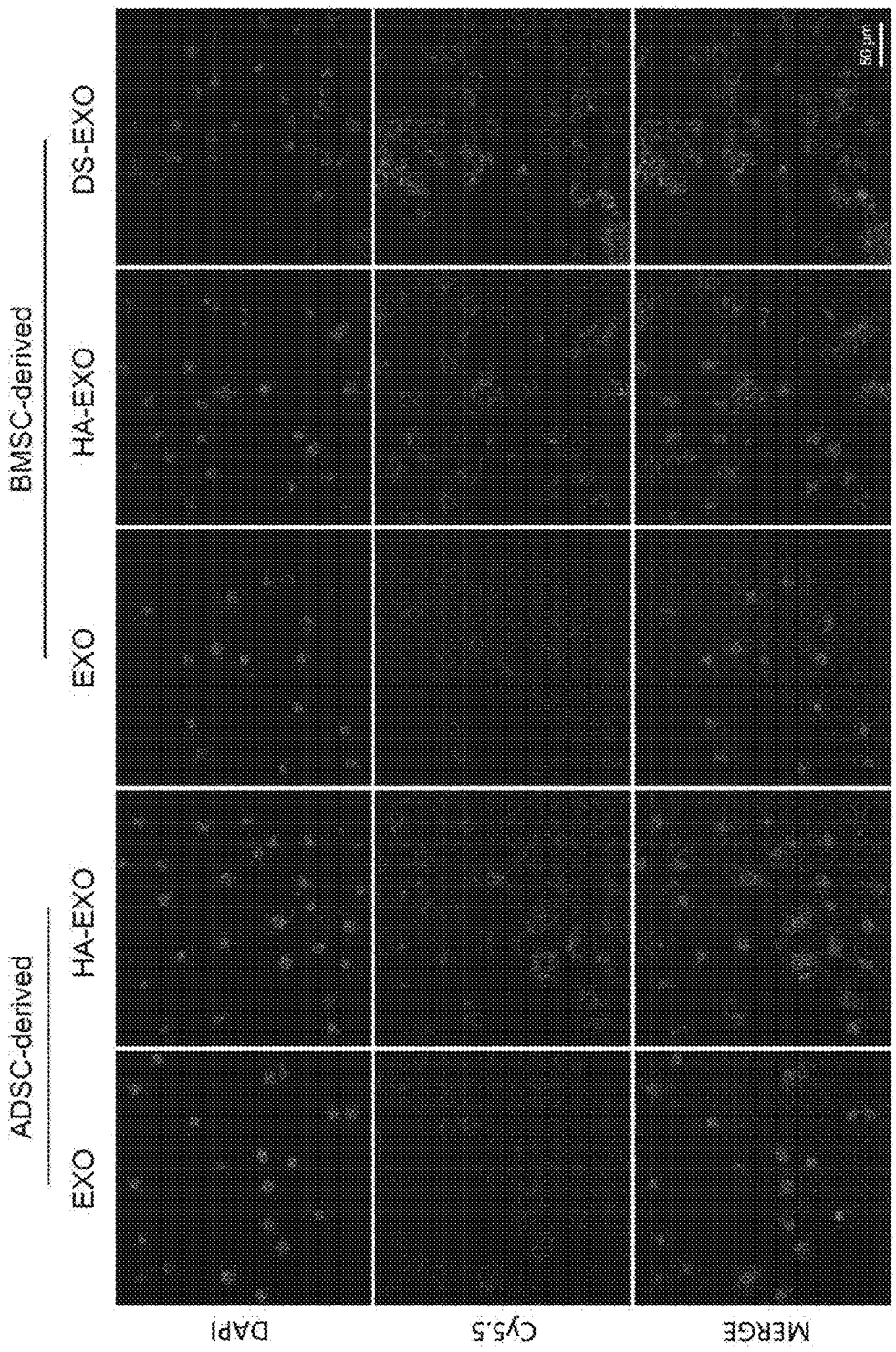
FIG. 6 is a fluorescence microscopic image for evaluating the macrophage targeting ability of an exosome surface-modified with dextran sulfate or hyaluronic acid according to one embodiment of the present invention.

In addition, from the evaluation of the therapeutic efficacy for rheumatoid arthritis, as shown in FIG. 5A, in a group treated with $10^8$ stem cell-derived exosomes surface-modified with dextran sulfate, most excellent therapeutic efficacy was shown. Particularly, as confirmed in FIG. 5B, it was confirmed that, by the administration of the stem cell-derived exosomes surface-modified with dextran sulfate, the concentrations of inflammatory cytokines such as IFN-γ, TNF-α, IL-6, IL-17A, G-CSF, GM-CSF and IL-1β were decreased, and conversely, the concentrations of antiinflammatory cytokines such as IL-4 and IL-10 were increased. This result shows that the surface-modified exosomes according to the present invention can be widely used to treat inflammatory autoimmune diseases.

Example 5. Evaluation of Macrophage Targeting Ability of Exosomes Surface-Treated With Dextran Sulfate and Exosomes Surface-Treated With Hyaluronic Acid As a material having a characteristic of specifically targeting a macrophage, in addition to dextran sulfate, hyaluronic acid (HA) may be used, and therefore, the inventors evaluated the macrophage targeting ability by including the hyaluronic acid on the surfaces of adipose stem cell-derived exosomes and bone marrow stem cell-derived exosomes. Dextran sulfate targets SR-A present in activated macrophages, and hyaluronic acid has a characteristic of specifically binding to an overexpressed CD44 receptor in the activated macrophage. First, each of an exosome surface-modified with dextran sulfate (DS-EXO) and an exosome surface-modified with hyaluronic acid (HA-EXO) were extracted from adipose stem cells and bone marrow stem cells, which were modified using sugar metabolic engineering. Afterward, each exosome was labeled with Cy5.5.

As a result of treating an M1 type-activated macrophage with the fluorescence-labeled adipose stem cell-derived exosome, compared with an unmodified exosome (EXO), it was confirmed that a hyaluronic acid-modified exosome (HA-EXO) exhibited a more effective cell phagocytic behavior. In addition, as a result of treating an M1 type-activated macrophage with the bone marrow stem cell-derived exosome, compared with an unmodified exosome (EXO), the hyaluronic acid-modified exosome (HA-EXO) and the exosome modified with dextran sulfate (DS-EXO) exhibited a more effective cell phagocytic behavior. The above results show that the exosome surface modification technology by sugar metabolic engineering and click chemistry is feasible in cells of various origins.

A composition including a surface-modified stem cell-derived exosome according to the present invention can increase therapeutic efficiency for various types of inflammatory macrophage-mediated autoimmune diseases including rheumatoid arthritis by specifically targeting activated macrophages, the composition is a purified component which can have a more excellent therapeutic effect and minimize side effects compared with conventional antiinflammatory agents, stem cell therapeutic agents or exosomes because it contains a gene, protein or growth factor related to the proliferation, differentiation and regeneration of stem cells, and does not include an antibiotic or serum, or harmful factors of the cell culture. In addition, since exosomes can be directly delivered to causative cells by intravenous injection therapy and topical administration, which can be simply applied without surgery, a cost reduction effect and a patient burden-reducing effect can also be exhibited.

It should be understood by those of ordinary skill in the art that the above description of the present invention is exemplary, and the exemplary embodiments disclosed herein can be easily modified into other specific forms without departing from the technical spirit or essential features of the present invention. Therefore, the exemplary embodiments described above should be interpreted as illustrative and not limited in any aspect.

What is claimed is:

1. A method of treating an inflammatory macrophage-mediated autoimmune disease in a subject, comprising
   administering to the subject a therapeutically effective amount of composition comprising a stem cell-derived exosome surface-modified with a sugar compound as an active ingredient,
   wherein the sugar compound is selected from the group consisting of dextran sulfate, chondroitin sulfate, dermatan sulfate, heparin and a combination thereof, and
   wherein the sugar compound is modified with a click compound.

2. The method of claim 1, wherein the click compound comprises cyclooctyne, tetrazine, or an analogue thereof as a functional group.

3. The method of claim 1, wherein the stem cell is one or more types of stem cells selected from the group consisting of adipose tissue stem cells (ASCs), bone marrow stem cells (BMSCs), embryonic stem cells (ESCs), umbilical cord stem cells (UCSCs), dental stem cells (DSCs) and amniotic fluid stem cells (AFSCs).

4. The method of claim 1, wherein the inflammatory macrophage-mediated autoimmune disease is selected from the group consisting of rheumatoid arthritis, juvenile rheumatoid arthritis, adult onset Still's disease, systemic lupus erythematosus, multiple sclerosis, systemic sclerosis, Sjogren's syndrome, primary biliary cirrhosis, celiac disease, inflammatory bowel disease, type I diabetes, autoimmune hemolytic anemia, Goodpasture syndrome, Graves' disease, Hashimoto's thyroiditis, myasthenia gravis, pemphigus and vasculitis.

5. The method of claim 1, wherein the exosome is obtained by a method comprising the following steps:
(a) treating stem cells with a precursor having an azide group to introduce the azide group on the surface of stem cells;
(b) reacting the stem cells with a sugar compound modified with a click compound; and
(c) obtaining an exosome surface-modified with the sugar compound from the stem cells,
wherein the sugar compound is selected from the group consisting of dextran sulfate, chondroitin sulfate, dermatan sulfate, heparin, and a combination thereof;
wherein the stem cell is adipose tissue stem cells (ASCs).

6. The method of claim 5, wherein the precursor having an azide group is one or more selected from the group consisting of N-azidoacetylmannosamine-tetraacylated (Ac4ManNAz), 6-azido-6-deoxy-N-acetyl-glucosamine-triacylated (Ac3-6AzGlcNAc), N-(4-pentynoyl)-galactosamine-tetraacylated (Ac4GalNAl), N-(4-pentynoyl)-glucosamine-tetraacylated (Ac4GlcNAl), N-(4-pentynoyl)-mannosamine-tetraacylated (Ac4ManNAl), N-azidoacetylgalactosamine-tetraacylated (Ac4GalNAz), N-azidoacetylglucosamine-tetraacylated (Ac4GlcNAz), 6-azide-trehalose (6-TreAz), O-alkyne-trehalose (O-AlkTMM) and 8-azido-3,8-dideoxy-D-manno-octulosonic acid (Kdo Azide).

7. The method of claim 5, wherein the click compound-modified sugar compound is dextran sulfate-dibenzocyclooctyne.

8. The method of claim 5, wherein the step (a) is to treat 1 to 50 μM of the precursor having an azide group for 1 to 72 hours.

9. The method of claim 5, wherein the step (b) is to react 1 to 50 μM of the sugar compound modified with a click compound with stem cells for 1 to 72 hours.

10. The method of claim 5, wherein the step (c) comprises the following steps:
(c-1) replacing the medium with a serum-free medium after the step (b) and culturing the stem cells for 1 to 72 hours;
(c-2) recovering a supernatant by centrifuging a cell culture obtained by culturing the stem cells; and
(c-3) concentrating the recovered supernatant.

11. The method of claim 10, wherein the centrifugation in the step (c-2) is performed at 1,000 to 5,000×g for 1 to 180 minutes.

12. The method of claim 10, wherein the concentration in the step (c-3) comprises:
filtering the recovered supernatant through a 0.1 to 1-μm filter; and
filtering molecules with a size of 300 kDa or less.

13. The method of claim 12, wherein the filtration of molecules with a size of 300 kDa or less is performed by diafiltration using a tangential flow filtration device.

14. The method of claim 1, wherein the composition reduces the concentration of an inflammatory cytokine.

15. The method of claim 1, wherein the composition increases the concentration of an antiinflammatory cytokine.

16. The method of claim 1, wherein the composition is a pharmaceutical composition or a health food composition.

17. An exosome obtained by the method of claim 5, which is surface-modified to target activated macrophages, derived from stem cells surface-modified with a sugar compound,
wherein the sugar compound is selected from the group consisting of dextran sulfate, chondroitin sulfate, dermatan sulfate, heparin, and a combination thereof,
wherein the sugar compound is modified with a click compound.

* * * * *